United States Patent
Hung et al.

(10) Patent No.: US 12,199,545 B2
(45) Date of Patent: Jan. 14, 2025

(54) PHASE COMPENSATION METHOD OF BRUSHLESS DIRECT CURRENT MOTOR AND MOTOR SYSTEM UTILIZING THE SAME

(71) Applicant: WELTREND SEMICONDUCTOR INC., Hsinchu (TW)

(72) Inventors: Chien-Tsung Hung, Hsinchu (TW); Ming-Sheng Liu, Hsinchu (TW); Meng-Che Tsai, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 124 days.

(21) Appl. No.: 18/199,373

(22) Filed: May 19, 2023

(65) Prior Publication Data
US 2024/0322716 A1    Sep. 26, 2024

(30) Foreign Application Priority Data
Mar. 20, 2023  (TW) ................... 112110153

(51) Int. Cl.
*H02P 6/15* (2016.01)
(52) U.S. Cl.
CPC .................................. *H02P 6/157* (2016.02)
(58) Field of Classification Search
CPC ...... H02P 25/03; H02P 25/026; H02P 25/022; H02P 25/062; H02P 25/064; H02P 6/00; H02P 6/08; H02P 6/182; H02P 6/157; H02P 6/153; H02P 6/16; H02P 25/086; H02P 25/089; H02P 27/06; H02P 27/04; H02P 27/08; H02P 6/28; H02P 21/18; H02P 21/22; H02P 6/15
See application file for complete search history.

(56) References Cited

U.S. PATENT DOCUMENTS

2015/0171780 A1    6/2015  Ko

FOREIGN PATENT DOCUMENTS

| TW | 202107833 A | 2/2021 | |
| TW | 202107836 A | 2/2021 | |
| TW | 202247590 A | 12/2022 | |
| WO | WO-2022064188 A1 * | 3/2022 | .......... H02P 23/0031 |

OTHER PUBLICATIONS

"Horvat Mate et al., A Method of Determining a Position of a Rotor of a Motor of a Brushless Permanent Magnet Motor, Mar. 31, 2022, Clarivate Analytics, pp. 1-62" (Year: 2022).*

* cited by examiner

*Primary Examiner* — Antony M Paul
(74) *Attorney, Agent, or Firm* — Winston Hsu

(57) ABSTRACT

A motor system includes a brushless direct current motor, a back electromotive force (EMF) circuit, and a control unit. The brushless direct current motor includes first to third windings. The back EMF circuit is coupled to the first to the third windings. The control unit is coupled to the back EMF circuit for floating the first winding, energizing the second winding, and energizing the third winding prior to detect a zero-crossing event. The back EMF detects a duration of a freewheeling period of a back EMF signal of the first winding and a zero-crossing event. The control unit updates respective initial angles of respective driving currents of the first to the third windings according to the duration of a freewheeling period, and performs commutation according to respective updated initial angles of the respective driving currents of the first to the third windings upon detecting the zero-crossing event.

10 Claims, 6 Drawing Sheets

PHASE COMPENSATION METHOD OF BRUSHLESS DIRECT CURRENT MOTOR AND MOTOR SYSTEM UTILIZING THE SAME

BACKGROUND OF THE INVENTION

1. Field of the Invention

The present invention is related to a motor system, in particular to a phase compensation method for a brushless direct current motor and a motor system thereof.

2. Description of the Prior Art

Brushless direct current (BLDC) motors are widely used in industrial, household, automotive, medical and other fields. Compared to conventional brushed motors, BLDC motors offer increased efficiency, reduced maintenance costs (with no actual wear), and a flat torque curve at all rated speeds.

However, when the load or rotational speed of the brushless direct current motor changes, the current phase of the driving current will lead or lag behind the voltage, decreasing motor efficiency. The related art adopts a manual phase compensation method to adjust the current phase of its driving current. The manual phase compensation method needs to record the 2 corresponding phase compensation values required for the lowest and highest motor speed segments, and use back and forth debugging between the 2 corresponding phase compensation values to obtain the best phase compensation value. The disadvantage of the manual phase compensation method is that it is time consuming to adjust and correct back and forth, and if the load changes during the operation of the motor, the original optimal phase compensation value will be distorted, decreasing motor efficiency. Another related technology employs a phase current detector to detect the driving current and a back electromotive force detector to detect the back electromotive force voltage at the same time, and detect the phase difference between the zero-crossing of the driving current and the zero-crossing of the back electromotive force voltage to perform phase compensation. However, the disadvantage of this method is it needs to increase the hardware cost to obtain the zero-crossing information of the driving current.

SUMMARY OF THE INVENTION

An embodiment discloses a phase compensation method for a brushless direct current motor adopting a sinusoidal pulse width modulation scheme. The brushless direct current motor comprises a first winding, a second winding and a third winding. The first winding, the second winding and the third winding are coupled to each other at a neutral point. The first winding is coupled to a first high-side switch and a first low-side switch. The first high-side switch is coupled to a power supply end. The first low-side switch is coupled to a ground end. The method comprises floating the first winding, energizing the second winding and energizing the third winding before detecting a zero-crossing event; detecting a duration of a freewheeling period of a back electromotive force voltage of the first winding and the zero-crossing event, wherein in the freewheeling period, a current continues to flow through a body diode of the first high-side switch or a body diode of the first low-side switch, and in the zero-crossing event, the back electromotive force voltage of the first winding reaches half of a supply voltage; updating a first initial angle of a first driving current of the first winding, a second initial angle of a second driving current of the second winding, and a third initial angle of a third driving current of the third winding according to the duration of the freewheeling period; and once the zero-crossing event is detected, performing commutation based on an updated first initial angle, an updated second initial angle, and an updated third initial angle.

Another embodiment discloses a motor system adopting a sinusoidal pulse width modulation scheme. The motor system comprises a brushless direct current motor, a driving circuit, a back electromotive force circuit and a control unit. The brushless direct current motor comprises a first winding, a second winding and a third winding coupled to each other at a neutral point. The driving circuit comprises a high-side switch and a low-side switch. The high-side switch comprises a control end, a first end coupled to a power supply end, and a second end coupled to the first winding. The low-side switch comprises a control end, a first end coupled to the first winding, and a second end coupled to a ground end. The back electromotive force circuit is coupled to the first winding, the second winding and the third winding. The control unit is coupled to the driving circuit and the back electromotive force circuit for floating the first winding, energizing the second winding, and energizing the third winding before detecting a zero-crossing event. The back electromotive force circuit detects a duration of a freewheeling period of a back electromotive voltage of the first winding and a zero-crossing event. In the freewheeling period, a current continues to flow through a body diode of the first high-side switch or a body diode of the first low-side switch. In the zero-crossing event, the back electromotive force voltage of the first winding reaches half of a supply voltage. The control unit updates a first initial angle of a first driving current of the first winding, a second initial angle of a second driving current of the second winding, and an initial angle of a third driving current of the third winding according to the duration of the freewheeling period. Once the zero-crossing event is detected, commutation is performed based on an updated first initial angle, an updated second initial angle, and an updated third initial angle.

These and other objectives of the present invention will no doubt become obvious to those of ordinary skill in the art after reading the following detailed description of the preferred embodiment that is illustrated in the various figures and drawings.

DETAILED DESCRIPTION

The term "unit" used in the specification may include any combination of software, firmware and hardware.

Figure 1:
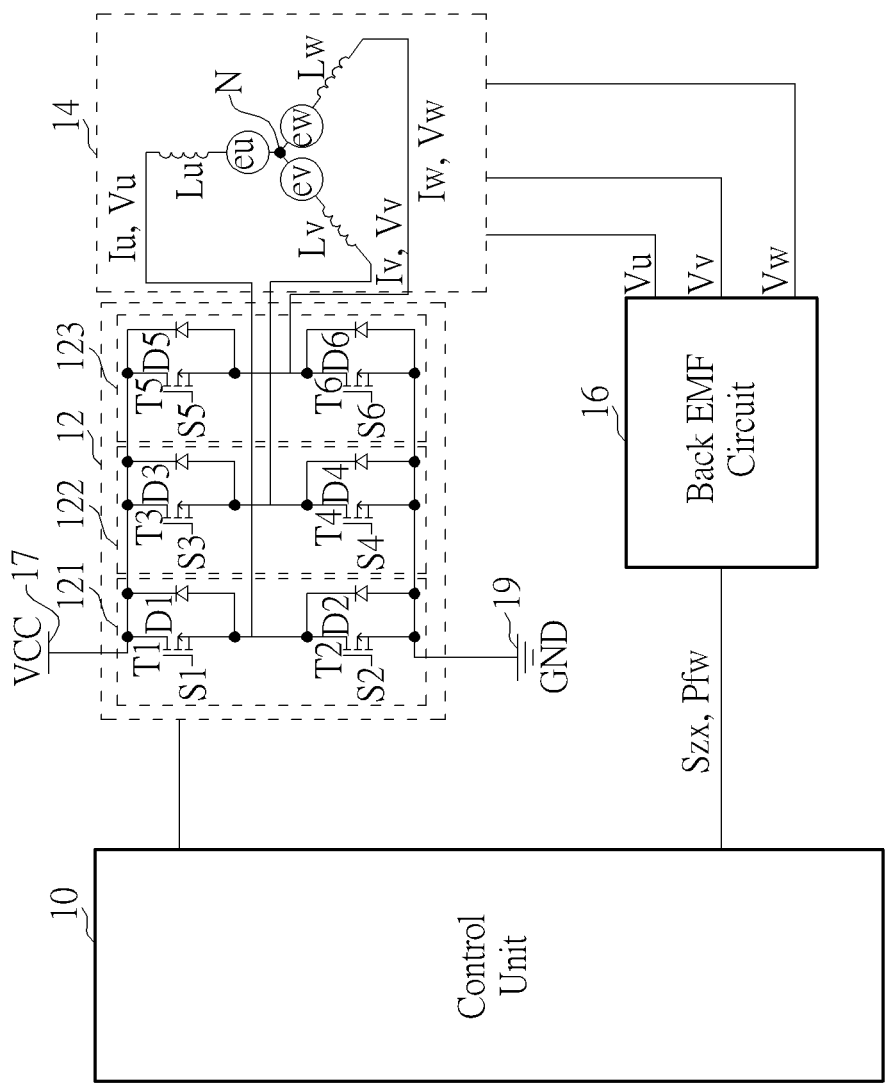
FIG. 1 is a schematic diagram of a sensorless motor system according to an embodiment of the present invention.

FIG. 1 is a schematic diagram of a sensorless motor system 1 adopting a sinusoidal pulse width modulation scheme in an embodiment of the present invention. The motor system 1 can realize automatic phase compensation only by using a control unit 10, a driving circuit 12, a brushless direct current motor 14 and a back electromotive force circuit 16, so that the back electromotive force voltage and the driving current of the brushless direct current motor 14 are synchronized, in order to save phase correction time and improve motor efficiency without increasing manufacturing cost.

The motor system 1 may include a control unit 10, a driving circuit 12, a brushless direct current (BLDC) motor 14 and a back electromotive force (back EMF) circuit 16. The control unit 10 can be coupled to the driving circuit 12, the driving circuit 12 can be coupled to the brushless direct current motor 14, the brushless direct current motor 14 can be coupled to the back EMF circuit 16, and the back EMF circuit 16 can be coupled to the control unit 10.

The brushless direct current motor 14 may include a rotor and a stator, and operate in three phases (U phase, V phase, and W phase). The rotor may be formed of permanent magnets rotatably set in the stator. The stator may include a yoke, a winding Lu, a winding Lv, and a winding Lw. The yoke may be cylindrical and surrounds the rotor. The winding Lu, the winding Lv and the winding Lw can be distributed on the circumference of the yoke, and the winding Lu, the winding Lv and the winding Lw can be coupled to each other at a neutral point N. In detail, the winding Lu may include a first end and a second end coupled to the neutral point N. Similarly, the winding Lv may include a first end and a second end coupled to the neutral point N. The winding Lw may include a first end and a second end coupled to the neutral point N.

The driving circuit 12 may be a sinusoidal pulse width modulation inverter (SPWM inverter). The driving circuit 12 may include a first group of switches 121 coupled to the first end of the winding Lu for generating the driving current Iu, a second group of switches 122 coupled to the first end of the winding Lv for generating the driving current Iv, and a third set of switches 123 coupled to the first end of the winding Lw for generating the driving current Iw. In detail, the first set of switches 121 may include a high-side switch T1 and a low-side switch T2, the second set of switches 122 may include a high-side switch T3 and a low-side switch T4, and the third set of switches 123 may include a high-side switch T5 and a low-side switch T6. The switches T1 to T6 can be N-type metal oxide semiconductor field-effect transistors (MOSFET). The high-side switch T1 may include a control end coupled to the control unit 10, a first end coupled to the power supply end 17, and a second end. The low-side switch T2 may include a control end coupled to the control unit 10, a first end coupled to the second end of the high-side switch T1, and a second end coupled to a ground end 19. The high-side switch T3 may include a control end coupled to the control unit 10, a first end coupled to the power supply end 17, and a second end. The low-side switch T4 may include a control end coupled to the control unit 10, a first end coupled to the second end of the high-side switch T3, and a second end coupled to the ground end 19. The high-side switch T5 may include a control end coupled to the control unit 10, a first end coupled to the power supply end 17, and a second end. The low-side switch T6 may include a control end coupled to the control unit 10, a first end coupled to the second end of the high-side switch T5, and a second end coupled to the ground end 19. The power supply end 17 can provide a supply voltage VCC, such as 3.3V, and the ground end 19 can provide a ground voltage GND, such as 0V. The switches T1 to T6 may have body diodes D1 to D6 respectively.

Figure 3:
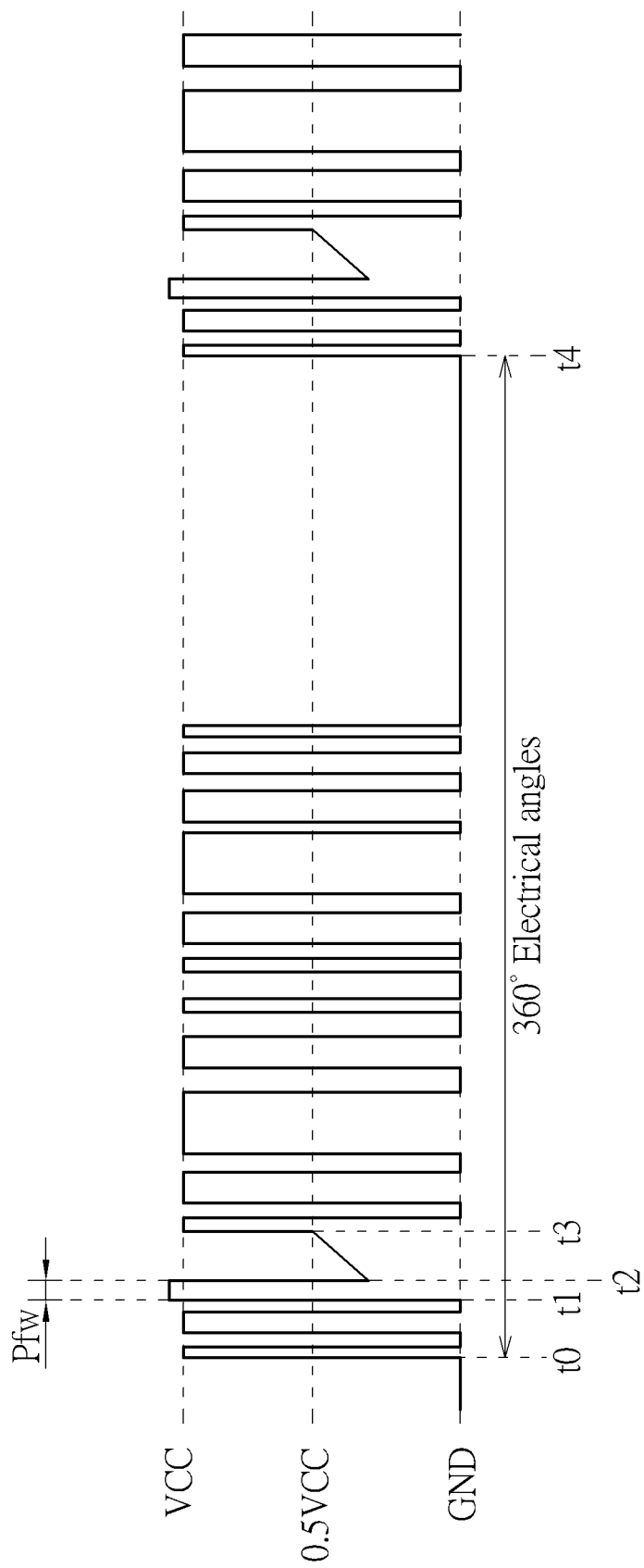
FIG. 3 is a waveform diagram of an end voltage of the motor system in FIG. 1.

The control unit 10 may include a microcontroller, a microprocessor, a field programmable gate array (FPGA) or other types of control units. The control unit 10 can generate control signals S1 to S6 to control the switches T1 to T6 respectively, and then respectively control the magnetizing and demagnetizing of the winding Lu, the winding Lv and the winding Lw. When the motor system 1 is in operation, the control unit 10 can control the driving circuit 12 to alternately energize two of the winding Lu, the winding Lv, and the winding Lw according to a predetermined order, and float the remaining one to form a rotating magnetic field, thereby driving the rotor to rotate. When the rotor rotates, the winding Lu, the winding Lv and the winding Lw can respectively generate a back electromotive force eu, a back electromotive force ev and a back electromotive force ew. The voltage at the first end of the floating winding among the winding Lu, the winding Lv and the winding Lw can be used to detect the back electromotive force. In some embodiments, if the winding Lu is a floating winding, the end voltage Vu at the first end of the winding Lu can be used to detect the back electromotive force eu. If the winding Lv is a floating winding, the end voltage Vv at the first end of the winding Lv can be used to detect the back electromotive force ev. If the winding Lw is a floating winding, the end voltage Vw at the first end of the winding Lw can be used to detect the back electromotive force ew. For example, the control unit 10 can generate a logic low control signal S1 and a logic low control signal S2 to make the first group of switches 121 float the winding Lu, and generate a logic low control signal S3 and a logic high control signal S4 to make the first end of winding Lv coupled to the ground end 19 and generate a sinusoidal pulse width modulation (SPWM) control signal S5 and a logic low control signal S6 to enable the second set of switches 122 to output the SPWM driving current Iw to the winding Lw. Since the current flows from the power supply end 17 to the ground end 19 through the winding Lw and the winding Lv, the winding Lw and the winding Lv are energized. Since the winding Lu is floating, the end voltage Vu (back electromotive force voltage) at the first end of the winding Lu will directly reflect the change of the back electromotive force eu. For clarity, the following paragraphs take the floating winding Lu, the energize winding Lv and the winding Lw to detect the back electromotive force eu from the end voltage Vu at the first end of the winding Lu as an example. The end voltage Vu can have an SPWM waveform, and the period and amplitude of each SPWM pulse can be the same or different, as shown in FIG. 3, which will be explained in detail in the following paragraphs.

The back electromotive force circuit 16 can detect the end voltage Vu of the winding Lu, the end voltage Vv of the winding Lv, or the duration Pfw of the freewheeling period of the end voltage Vw of the winding Lw and the zero-crossing event Szx, and transmit the duration Pfw of the freewheeling period and the zero-crossing event Szx to the control unit 10. In the freewheeling period of the back electromotive force voltage, the current continues to flow through the body diode of the high-side switch or the body diode of the low-side switch. For example, if the low-side switch T2 is switched from on to off and the high-side switch T1 remains off, since the winding Lu still stores energy, the current will flow through the loop formed by the high-side switch T5, the winding Lw, the neutral point N, the winding Lu, and the body diode D1 of the high-side switch T1 until the energy in the winding Lu is exhausted, and the first freewheeling period of the end voltage Vu is generated. In the first freewheeling period of the end voltage Vu, the end voltage Vu is clamped by the body diode D1 to approximately equal to the power supply voltage VCC. In another example, if the high-side switch T1 is switched from on to off and the low-side switch T2 remains off, since the winding Lu still stores energy, the current will flow through the loop formed by the body diode D2 of the low-side switch T2, the winding Lu, the neutral point N, the winding Lw, and the low-side switch T6 until the energy in the winding Lu is exhausted, thereby generating a second freewheeling period of the end voltage Vu. In the second freewheeling period of the end voltage Vu, the end voltage Vu is clamped by the body diode D2 to approximately equal to the ground voltage GND. At the zero-crossing point of the back electromotive force voltage, the end voltage of the floating winding reaches half of the power supply voltage VCC.

The control unit 10 can update the initial angle of the driving current Iu of the winding Lu, the initial angle of the driving current Iv of the winding Lv and the initial angle of the driving current Iw of the winding Lw according to the duration Pfw of the freewheeling period.

If the duration Pfw of the freewheeling period is equal to the predetermined value, the control unit 10 can control the driving circuit 12 to keep the initial angle of the driving current Iu, the initial angle of the driving current Iv and the initial angle of the driving current Iw unchanged. In some embodiments, if the duration Pfw of the freewheeling period is within the tolerance of the predetermined value, it may be considered that the duration Pfw of the freewheeling period is equal to the predetermined value. For example, the predetermined value may be 1 microsecond (μs), the tolerance may be ±10%, and the predetermined initial angle of the driving current Iu may be 30° electrical angle. If the duration Pfw of the freewheeling period of the end voltage Vu is 0.95 μs, it is considered that the duration Pfw of the freewheeling period is equal to the predetermined value, so the initial angle of the driving current Iu can be maintained at 30° electrical angle. In some embodiments, the control unit 10 can also maintain the initial angles of the driving current Iv and the driving current Iw.

If the duration Pfw of the freewheeling period exceeds a predetermined value, the control unit 10 can control the driving circuit 12 to increase the initial angle of the driving current Iu, the initial angle of the driving current Iv and the initial angle of the driving current Iw to update the initial angle of the driving current Iu of the winding Lu, the initial angle of the driving current Iv of the winding Lv and the initial angle of the driving current Iw of the winding Lw. In some embodiments, the control unit 10 can calculate the absolute difference between the duration Pfw of the freewheel period and the predetermined value, and increase the initial angle of the driving current Iu, the initial angle of the driving current Iv and the initial angle of the driving current Iw according to the absolute difference. In some embodiments, if the duration Pfw of the freewheeling period exceeds the maximum tolerance of the predetermined value, it may be considered that the duration Pfw of the freewheeling period exceeds the predetermined value. In some embodiments, the control unit 10 can linearly increase the initial angle of the driving current Iu, the initial angle of the driving current Iv, and the initial angle of the driving current Iw according to the absolute difference. For example, the predetermined value may be 1 μs, the tolerance may be ±10%, and the predetermined initial angle of the driving current Iu may be 30° electrical angle. If the duration Pfw of the freewheeling period of the end voltage Vu is 1.15 μs, it can be considered that the duration Pfw of the freewheeling period exceeds the predetermined value, so the control unit 10 can fix the electrical angle, for example, +1° degree of electrical angle to update the initial angle of the driving current Iu to generate an updated initial angle (31° electrical angle). In some embodiments, the control unit 10 can also increase the initial angle of the driving current Iv and the initial angle of the driving current Iw in a similar manner.

If the duration Pfw of the freewheeling period of the end voltage Vu is less than the predetermined value, the control unit 10 can control the driving circuit 12 to reduce the initial angle of the driving current Iu, the initial angle of the driving current Iv and the initial angle of the driving current Iw to update the initial angle of the driving current Iu of the winding Lu, the initial angle of the driving current Iv of the winding Lv and the initial angle of the driving current Iw of the winding Lw. In some embodiments, the absolute difference between the duration of the freewheeling period and the predetermined value is calculated, and the initial angle of the driving current Iu, the initial angle of the driving current Iv, and the initial angle of the driving current Iw are reduced according to the absolute difference. In some embodiments, if the duration of the freewheeling period is less than the minimum tolerance of the predetermined value, it may be considered that the duration of the freewheeling period is shorter than the predetermined value. In some embodiments, the control unit 10 can linearly reduce the initial angle of the driving current Iu, the initial angle of the driving current Iv, and the initial angle of the driving current Iw according to the absolute difference. For example, the predetermined value may be 1 μs, the tolerance may be ±10%, and the predetermined initial angle of the driving current Iu may be 30° electrical angle. If the duration of the freewheeling period of the end voltage Vu is 0.85 μs, it can be considered that the duration of the freewheeling period is less than the predetermined value, so the control unit 10 can fix the electrical angle, for example, −1° electrical angle to update the initial angle of the driving current Iu to generate an updated initial angle (29° electrical angle). In some embodiments, the control unit 10 can also reduce the initial angle of the driving current Iv and the initial angle of the driving current Iw in a similar manner.

Then, the control unit 10 may perform commutation according to the updated initial angle of the driving current Iu, the updated initial angle of the driving current Iv, and the updated initial angle of the driving current Iw after detecting the zero-crossing event Szx, to implement automatic phase compensation.

Figure 2:
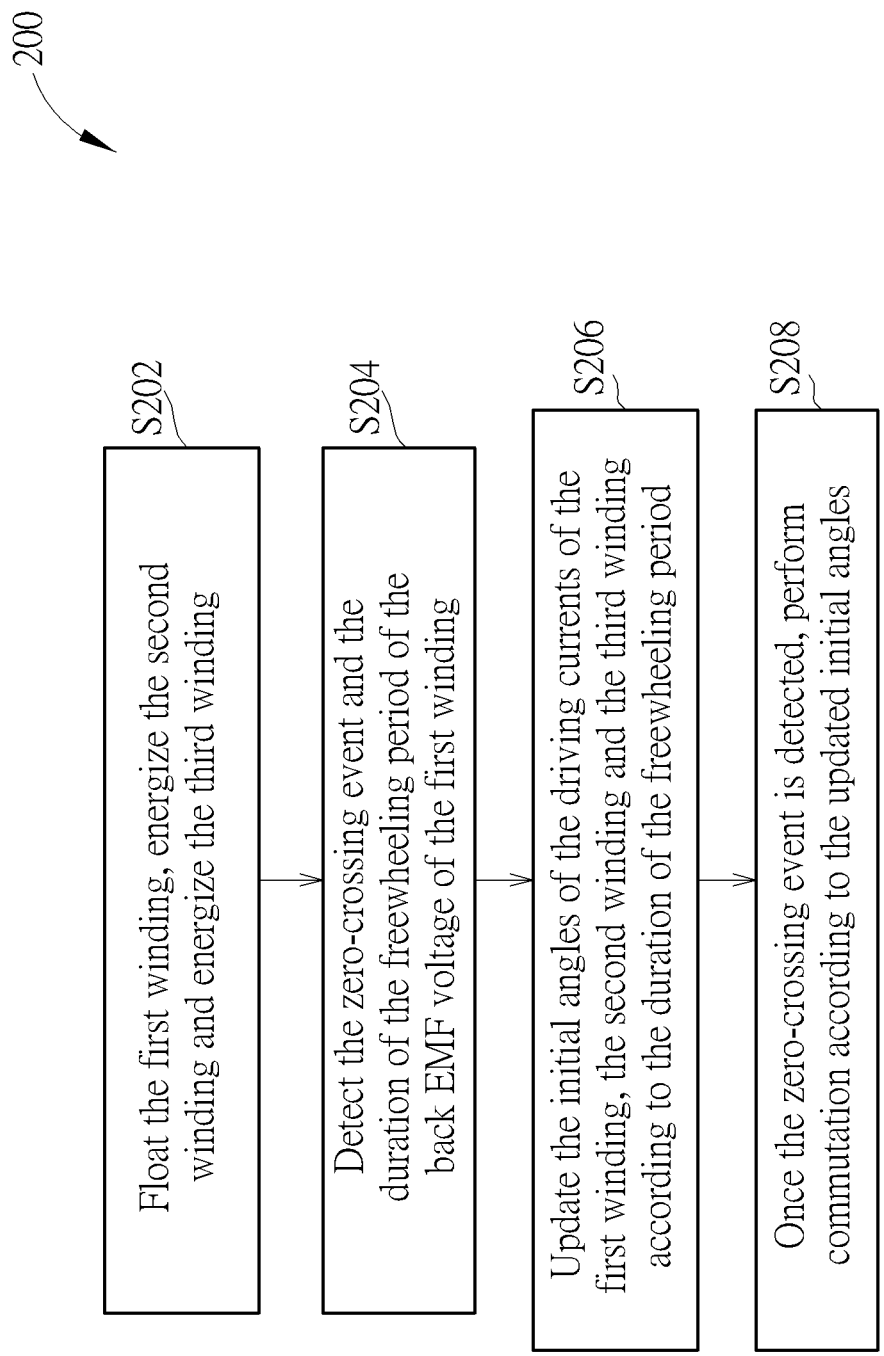
FIG. 2 is a flow chart of a phase compensation method for the motor system in FIG. 1.

FIG. 2 is a flow chart of a phase compensation method 200 for the motor system 1. The phase compensation method 200 includes steps S202 to S208 for realizing automatic phase compensation of the motor system 1. Any reasonable alterations, sequences or adjustments are within the scope of the present disclosure. Steps S202 to S208 are explained as follows:

Step 202: The driving circuit 12 floats the first winding, energizes the second winding and energizes the third winding;

Step 204: the back EMF circuit 16 detects the zero-crossing event and the duration Pfw of the freewheeling period of the back EMF voltage of the first winding;

Step 206: update the initial angles of the driving currents of the first winding, the second winding and the third winding according to the duration Pfw of the freewheeling period;

Step 208: once the zero-crossing event is detected, perform commutation according to the updated initial angles of the first winding, the second winding, and the third winding.

In step S202, the first winding can be the winding Lu, and the second winding and the third winding can be the windings Lv and Lw respectively. Step S202 is performed before detecting the zero-crossing event. Steps S204 to S208 can be referred to FIG. 3 and explained by detecting the zero-crossing of the end voltage Vu. FIG. 3 is a waveform diagram of the end voltage Vu, Vv or Vw of the motor system 1, such as a waveform diagram of the end voltage Vu, wherein the horizontal axis represents time and the vertical axis represents voltage. The period between time t0 and time t1 may cover 3600 electrical angles.

At time t0, the end voltage Vu is equal to the supply voltage VCC, and the electrical angle is 0°.

At time t1, the end voltage Vu is clamped to the power supply voltage VCC, and the freewheeling period begins. At time t2, the end voltage Vu falls below half of the power supply voltage VCC, and the freewheeling period ends. The period between time t1 and time t2 may be the duration Pfw of the freewheeling period. The back electromotive force circuit 16 detects the duration Pfw of the freewheeling period of the end voltage Vu (step S204), and updates the initial angles of the driving currents Iu, Iv and Iw of the windings Lu, Lv and Lw according to the duration Pfw of the freewheeling period (step S206).

At time t3, the end voltage Vu is equal to half of the power supply voltage VCC, the back electromotive force circuit 16 detects a zero-crossing event (step S204), and the driving currents Iu, Iv and Iw of the winding Lu, Lv and Lw are commutated according to the updated initial angle (step S208).

In some embodiments, the control unit 10 can detect the duration Pfw of the freewheeling period each time the winding is floating to obtain phase compensation information, so as to perform phase lead compensation or lag compensation. Therefore, the phase angle can be corrected every time the freewheeling period is detected, and this cycle keeps the freewheeling period in a reasonable state. If the load changes, the phase compensation information will also be reflected on the freewheeling period, so that automatic phase compensation can be performed as the load changes.

Although the embodiment shows that the end voltage Vu is used to detect the zero-crossing point, the present disclosure is not limited thereto. Those skilled in the art can also use the end voltage Vv or the end voltage Vw to detect the zero-crossing when the winding Lv or Lw is floating.

Figure 4:
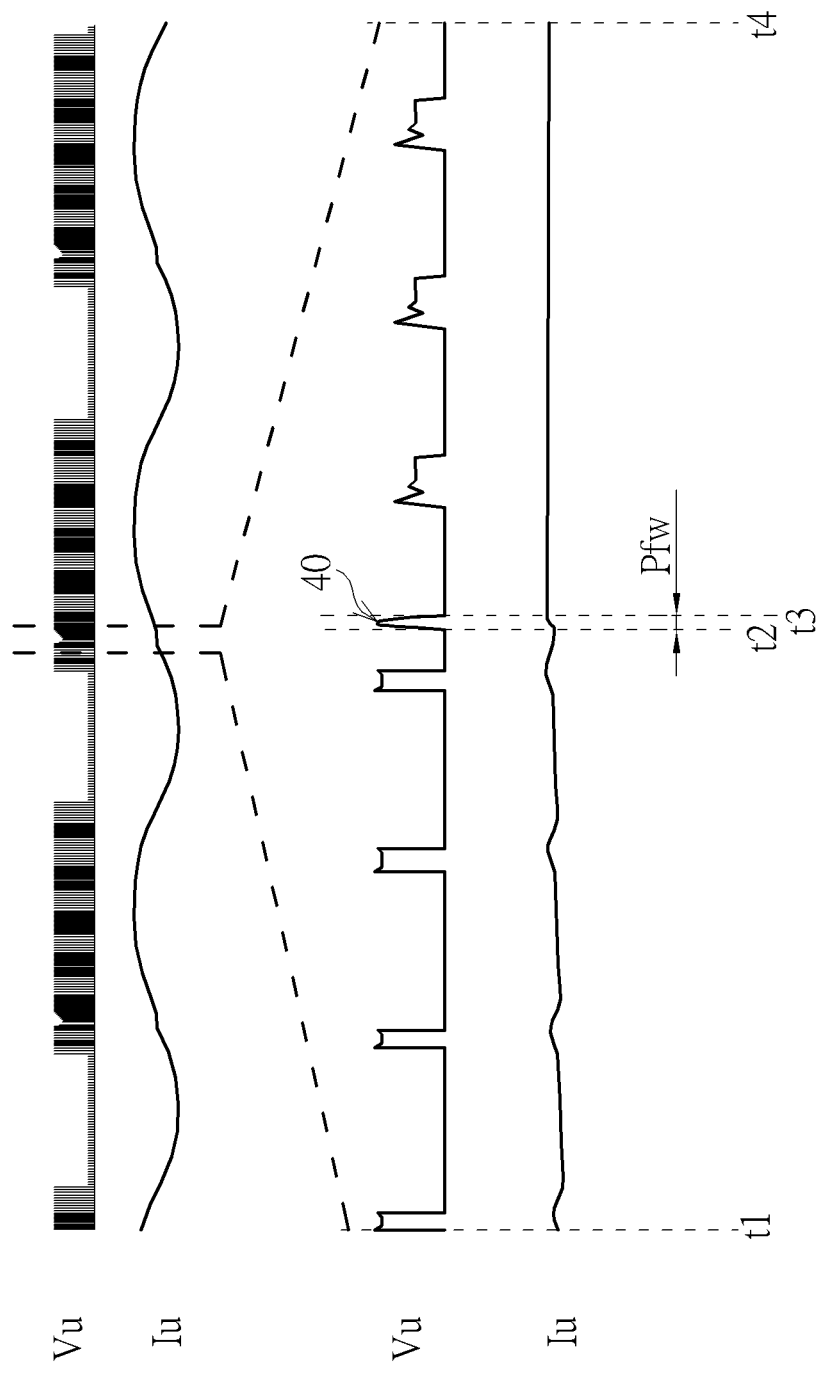
FIG. 4 shows a waveform diagram of a signal of the motor system in FIG. 1 in phase normal.
Figure 5:
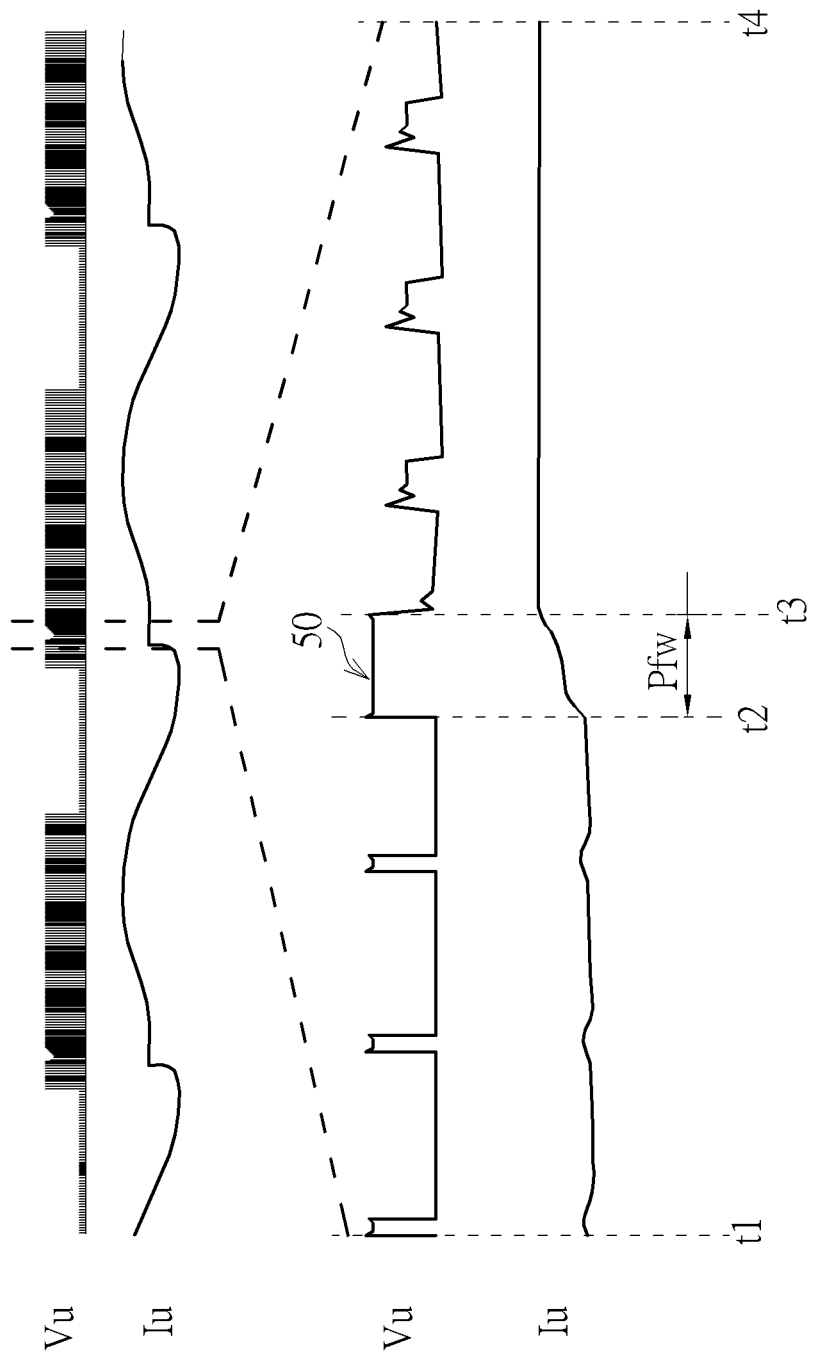
FIG. 5 shows a waveform diagram of a signal of the motor system in FIG. 1 in phase lag.
Figure 6:
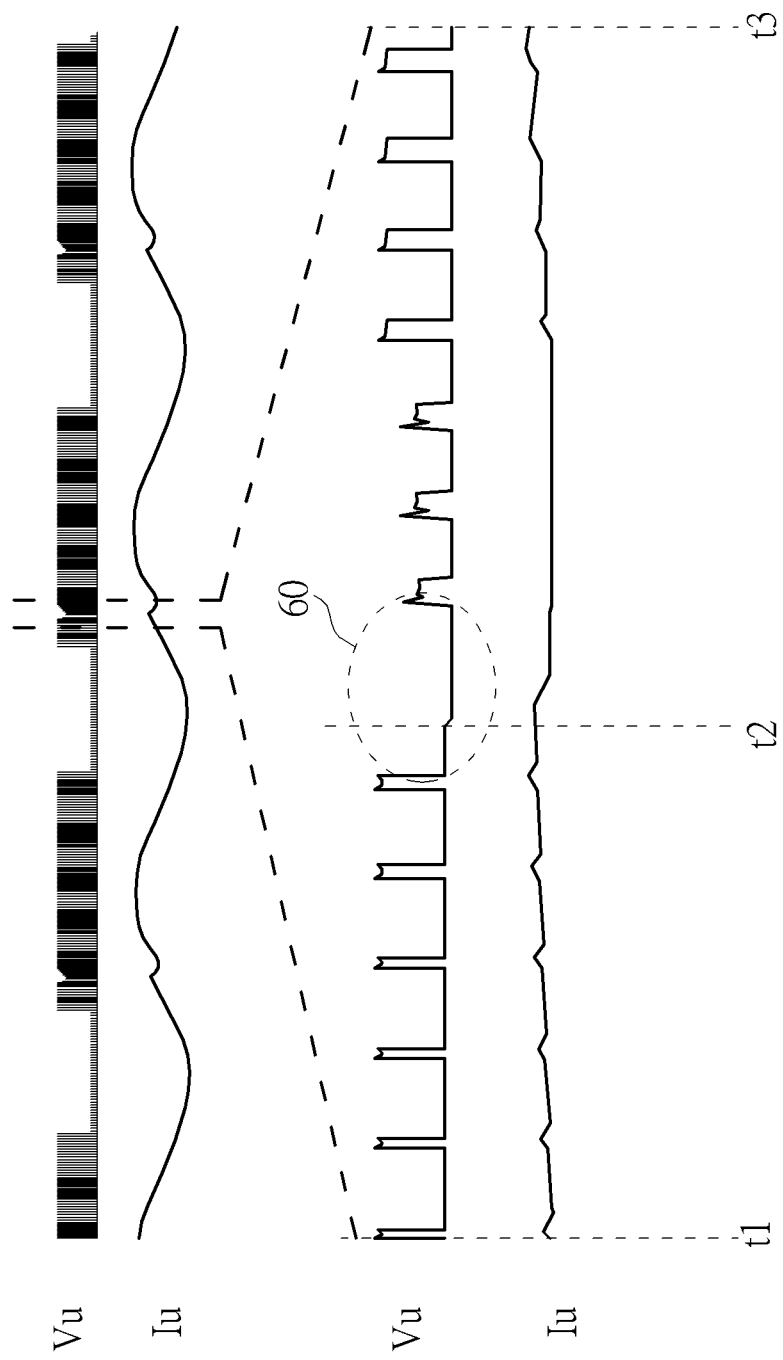
FIG. 6 shows a waveform diagram of a signal of the motor system in FIG. 1 in phase lead.

FIG. 4 to FIG. 6 respectively show the waveform diagrams of the signal of the motor system 1 in phase normal, phase lag and phase lead, wherein the horizontal axis represents time, and the vertical axis represents voltage or current. Referring to FIG. 4, when the phase is normal, the driving current Iu has a sinusoidal waveform. The lower part of FIG. 4 is an enlarged view of the upper part between time t1 and t4. At time t2, the winding Lu starts floating and the freewheeling period 40 of the end voltage Vu takes place. At time t3, the freewheeling period 40 of the end voltage Vu ends. The duration Pfw of the freewheeling period 40 is the difference (t3−t2) between the time t3 and the time t2.

Referring to FIG. 5, when the phase lags behind, the driving current Iu no longer forms a sinusoidal waveform. The lower part of FIG. 5 is an enlarged view of the upper part between time t1 and t4. At time t2, the winding Lu starts floating and the freewheeling period 50 of the end voltage Vu takes place. At time t3, the freewheeling period 50 of the end voltage Vu ends. The duration Pfw of the freewheeling period 50 is the difference (t3−t2) between the time t3 and the time t2. The duration Pfw of the freewheeling period 50 is greater than the duration Pfw of the freewheeling period 40. FIG. 5 shows that when the phase lags behind, the duration Pfw of the freewheeling period will increase accordingly.

Referring to FIG. 6, when the phase is advanced, the driving current Iu also does not form a sinusoidal waveform. The lower part of FIG. 6 is an enlarged view of the upper part between time t1 and time t3. At time t2, the winding Lu starts to float, and the freewheeling period 60 of the end voltage Vu does not occur, so the duration of the freewheeling period 60 is shorter than the duration Pfw of the freewheeling period 40. FIG. 6 shows that when the phase is advanced, the duration of the freewheeling period will decrease accordingly.

In the embodiment of the present invention, when the speed or load changes, the control unit 10 will quickly correct the phase according to the duration of the freewheeling period of the back electromotive voltage, and when the speed and load are stable, the control unit 10 will lock the driving current in positive phase. For example, when the motor speed increases, the phase of the driving current will lag behind the phase of the back electromotive force voltage. At this time, the control unit 10 can increase the phase of the driving current to perform leading angle driving compensation, to synchronize the phase of back electromotive force voltage with the driving current to achieve high efficiency motor drive. Conversely, when the motor speed decreases, the phase of the driving current will lead the phase of the back electromotive force voltage, at this time, the control unit 10 can reduce the phase of the driving current to compensate for lagging angle driving, to synchronize the phase of the back electromotive force voltage and the driving current to achieve high efficiency motor driving.

Embodiments in FIG. 1 to FIG. 6 automatically perform phase compensation according to the duration of the freewheeling period of the back electromotive force voltage, without manually adjusting the phase back and forth and immediately compensating the phase of the driving current according to the current freewheeling period state, even if the load changes, it can respond quickly, saving phase correction time, and at the same time, it does not need to increase hardware costs and save hardware space.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A phase compensation method for a brushless direct current motor adopting a sinusoidal pulse width modulation scheme, the brushless direct current motor comprising a first winding, a second winding and a third winding, the first winding, the second winding and the third winding being coupled to each other at a neutral point, the first winding being coupled to a first high-side switch and a first low-side switch, the first high-side switch being coupled to a power supply end, the first low-side switch being coupled to a ground end, the method comprising:

floating the first winding, energizing the second winding and energizing the third winding before detecting a zero-crossing event;

detecting a duration of a freewheeling period of a back electromotive force voltage of the first winding and the zero-crossing event, wherein in the freewheeling period, a current continues to flow through a body diode of the first high-side switch or a body diode of the first low-side switch, and in the zero-crossing event, the back electromotive force voltage of the first winding reaches half of a supply voltage;

updating a first initial angle of a first driving current of the first winding, a second initial angle of a second driving current of the second winding, and a third initial angle of a third driving current of the third winding according to the duration of the freewheeling period; and once the zero-crossing event is detected, performing commutation based on an updated first initial angle, an updated second initial angle, and an updated third initial angle.

2. The method of claim 1, wherein updating the first initial angle of the first driving current of the first winding, the second initial angle of the second driving current of the second winding, and the third initial angle of the third driving current of the third winding, comprises:

if the duration of the freewheeling period is equal to a predetermined value, retaining the first initial angle, the second initial angle and the third initial angle.

3. The method of claim 1, wherein updating the first initial angle of the first driving current of the first winding, the second initial angle of the second driving current of the second winding, and the third initial angle of the third driving current of the third winding, comprises:

if the duration of the freewheeling period exceeds a predetermined value, increasing the first initial angle, the second initial angle and the third initial angle.

4. The method of claim 3, wherein if the duration of the freewheeling period exceeds the predetermined value, increasing the first initial angle, the second initial angle and the third initial angle, comprises:

calculating an absolute difference between the duration of the freewheeling period and the predetermined value; and increasing the first initial angle, the second initial angle and the third initial angle according to the absolute difference.

5. The method of claim 1, wherein updating the first initial angle of the first driving current of the first winding, the second initial angle of the second driving current of the second winding, and the third initial angle of the third driving current of the third winding according to the duration of the freewheeling period, comprises:

if the duration of the freewheeling period is less than a predetermined value, reducing the first initial angle, the second initial angle and the third initial angle.

6. The method of claim 5, wherein if the duration of the freewheeling period is less than the predetermined value, reducing the first initial angle, the second initial angle and the third initial angle, comprises:

calculating an absolute difference between the duration of the freewheeling period and the predetermined value; and decreasing the first initial angle, the second initial angle and the third initial angle according to the absolute difference.

7. A motor system adopting a sinusoidal pulse width modulation scheme comprising:

a brushless direct current motor comprising a first winding, a second winding and a third winding coupled to each other at a neutral point;

a driving circuit comprising:
a first high-side switch comprising a control end, a first end coupled to a power supply end, and a second end coupled to the first winding; and
a first low-side switch comprising a control end, a first end coupled to the first winding, and a second end coupled to a ground end;

a back electromotive force circuit coupled to the first winding, the second winding and the third winding; and a control unit coupled to the driving circuit and the back electromotive force circuit for floating the first winding, energizing the second winding and energizing the third winding before detecting a zero-crossing event;

wherein the back electromotive force circuit detects a duration of a freewheeling period of a back electromotive voltage of the first winding and a zero-crossing event, in the freewheeling period, a current continues to flow through a body diode of the first high-side switch or a body diode of the first low-side switch, and in the zero-crossing event, the back electromotive force voltage of the first winding reaches half of a supply voltage; and the control unit updating a first initial angle of a first driving current of the first winding, a second initial angle of a second driving current of the second winding, and an initial angle of a third driving current of the third winding according to the duration of the freewheeling period, and once the zero-crossing event is detected, commutation is performed based on an updated first initial angle, an updated second initial angle, and an updated third initial angle.

8. The motor system of claim 7, wherein if the duration of the freewheeling period is equal to a predetermined value, the control unit retains the first initial angle, the second initial angle and the third initial angle.

9. The motor system of claim 7, wherein if the duration of the freewheeling period exceeds a predetermined value, the control unit increases the first initial angle, the second initial angle and the third initial angle.

10. The motor system of claim 7, wherein if the duration of the freewheeling period is less than a predetermined value, the control unit decreases the first initial angle, the second initial angle and the third initial angle.

* * * * *